Nov. 3, 1959
W. M. NIEHART
2,911,011
HUMIDIFYING APPARATUS
Filed Feb. 20, 1958
2 Sheets-Sheet 2
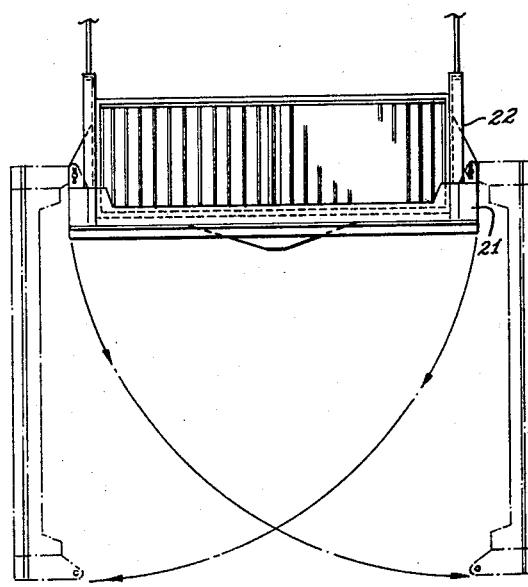
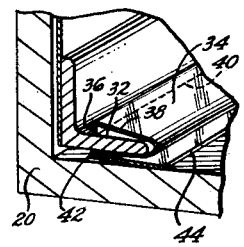
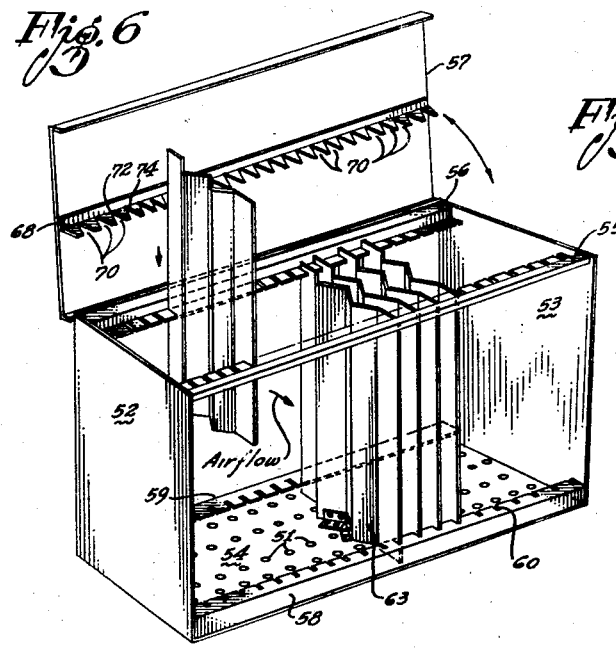
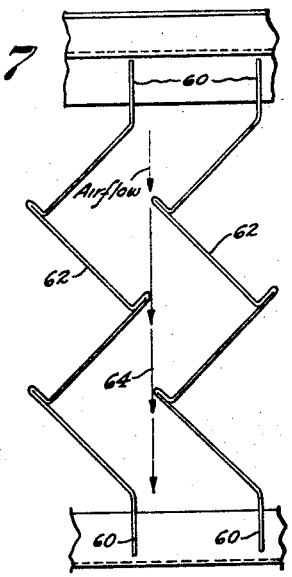
INVENTOR:
William M. Niehart
Attorneys

United States Patent Office 2,911,011
Patented Nov. 3, 1959

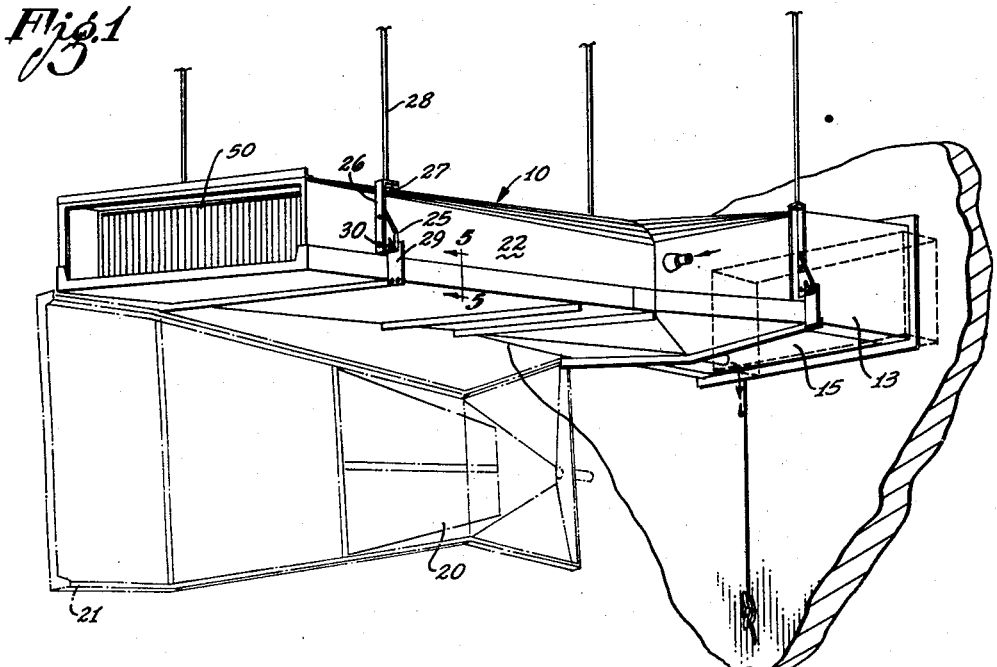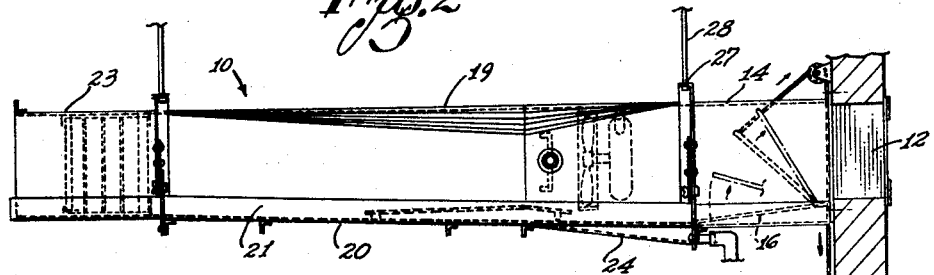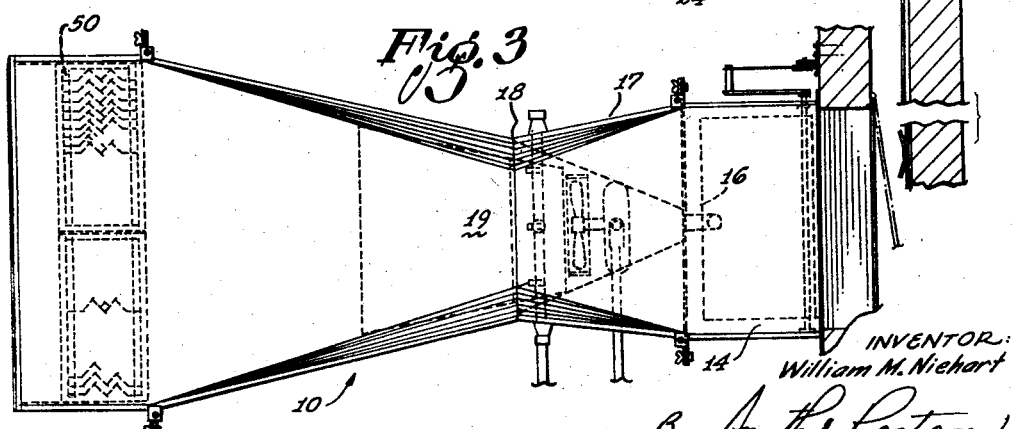

2,911,011

HUMIDIFYING APPARATUS

William M. Niehart, Los Angeles, Calif.

Application February 20, 1958, Serial No. 716,503

2 Claims. (Cl. 138—75)

This invention relates to spray draft units for humidifying and controlling the temperature of storage houses, particularly those in which fruits and vegetables are kept until marketed. The present invention involves certain improvements in various features of the basic apparatus which is described and illustrated in my prior now expired Patent No. 2,217,130.

This apparatus has included a horizontal duct of venturi construction defining a venturi throat in which throat are disposed spray nozzles directed horizontally toward the outlet end of the duct. An impelling fan is provided in the duct rearwardly of, and adjacent the spray nozzles for blowing dry air, admitted at the inlet end of the duct, through the duct and into the storage room when humidification is not desired. Such air may also be admitted and blown past the nozzles when it is desired to "fog out" (a term used in the art connoting the supplying of a large amount of moisture laden air to the storage area to effect rapid cooling of fruit on very hot days). The bottom of the duct is conventionally sloped downwardly from the duct outlet back toward and past the throat and nozzle to serve as a sump. At the outlet end of the duct, an eliminator is provided to remove excess water in the air which is thus humidified, and the air after passage through the eliminator is vented to the room or storage chamber which is to be humidified.

In the original apparatus of this nature, the horizontal duct was constructed of sheet metal bent or formed in the outline of a truncated prism, and soldered together at its seam. Where apparatus thus constructed was employed in hard water areas, it was found that, after relatively short periods of operation, a considerable amount of scale collected on the bottom of the duct and on the eliminator blades.

Cleaning of the thus originally constructed ducts and eliminators was quite difficult so that it has been proposed to employ a removable bottom for the duct, thereby to enable the bottom to be taken down and scrubbed or cleaned to remove scale deposits. Due to the extensive size of the apparatus, the bottom pans have been secured on each side of the duct by removable pins. The pairs of these pins on either side of the duct may serve as hinges about which the pan may be swung downwardly upon removal of the pins from the other side. Alternatively, pins on both sides may be removed so that the whole bottom pan may be taken down. It has been found, however, that with this construction, water or water laden air has tended to be blown or forced out of the sides of the duct along the lines of juncture of the bottom pan and vertical side walls. If the bottom pan is made with such a tight fit to the side walls that such leakage is effectively inhibited, it has been found to be difficult to fit the pans tightly on to the side walls of the ducts once they have been removed. On the other hand, if the fit is not tight, the undesirable leakage occurs.

It is a feature of the present invention to provide means for effectively sealing the juncture between the lower portion of the vertical side walls and the bottom pan. This is accomplished by providing a horizontal piece of short width which extends for the remaining length of duct from the venturi throat, which piece is angled inwardly from the side walls and formed integrally with the latter, to be adapted to abut the bottom pan. In conjunction with each of these pieces, there is further provided a long strip of resilient metal which is bent to an S-shaped cross section. When this strip of metal is fitted over the horizontally and inwardly extending strip or flange of the side wall, a metal spring or pressure seal is affected between the bottom of the pan and the flange for the full length of the duct from the point where the water spray enters the duct. This metal strip seal on each side of the pan does not interfere with the pivotal mounting of the pan on the side walls, and, in fact, renders it practicable to employ ducts with removable bottom portions.

Another problem with apparatus of this type prior to the present invention has been the inability to provide the eliminator blading in the outlet end of the duct, which blading may, after removal for cleaning, be properly and easily re-positioned. The eliminator blading, to be effective, should be arranged in such a manner that there is practically little more than a hairline width direct passage between adjacent blades. If the direct passages through the blading are so great in width that light can be seen clearly between the blades, the eliminator becomes largely ineffective to remove excessive moisture entrained in the air thus blown through the duct.

On the other hand, if all direct passage through the blading is blocked, by virtue of fact that the blading is too close together, the eliminators tend to remove too much moisture and impede the flow of humidified air from the duct outlet, thereby rendering the unit ineffective as a humidifier. Eliminator blades are formed of thin sheets of metal crimped to a zig-zag cross section. Because the metal is thin, it does not readily hold its shape even when supported at both sides by slotted cross members into which the edges of the crimped blading are inserted; and the blading is invariably distorted whenever it is taken out and cleaned or scraped down. In units heretofore made, therefore, a great deal of time is spent by service men in trying to re-set the blading in the eliminator box after cleaning, in such a manner that each passage between adjacent blades is of proper shape and width.

It is a further feature of the present invention to provide means on the underside of the top of the eliminator box, which means may be brought down over the series of blades contained in the box properly to re-form and re-position the blades after cleaning. Such means further, at all times, serves as an additional support for the blading to hold it in proper position. This means comprises a serrated horizontal member secured to the underside of the removable top of the box across the midsection thereof, the position of each serration being predetermined at the plant when the unit is made, so that when the top of the box is closed down over the two vertical side walls and top horizontal corner members therebetween, each serration catches a blade, draws it horizontally back into shape, and properly positions it relative to adjacent blades. In this manner optimum alignment of the blading through the entire eliminator box is quickly and accurately effected. It becomes unnecessary, therefore, for a service man, as in the past, to spend a considerable amount of time re-positioning each of the blades and checking its alignment with adjacent blades against a light source to be sure that optimum passage width is attained between each adjacent pair of blades.

These features and accomplishments of the present inventive apparatus may be more readily understood from the following description in conjunction with the accompanying drawings in which:

Figure 1 is a perspective view of a complete unit attached to a storage room ceiling and wall;

Figure 2 is a side elevation of my apparatus;

Figure 3 is a plan view of the same;

Figure 4 is an end elevation looking in from the left hand side of Figure 2;

Figure 5 is a detail partly in section taken on the line 5—5 of Figure 1;

Figure 6 is a perspective view of one of the two eliminator boxes from which a number of the vanes have been removed; and Figure 7 is an enlarged fragmentary plan view showing one of the vanes embedded in opposite cross pieces of the eliminator box.

Referring to Figure 1, it will be seen that the improved spray unit 10 of the present invention is similar in basic construction to the unit shown in my prior patent in that it is comprised of an inner end formed of straight side walls 13, a top wall 14, and a downwardly inclined bottom wall 15. The bottom wall 15 similarly includes a damper 16. The inner end further includes walls 17 which converge to form a venturi throat at 18. The top wall 19 of the duct is formed as an extension of the wall 14, being rounded at the corners particularly in the area of the throat 18.

The bottom pan 20 is constructed as a detachable unit beginning at the forward extremity of the inlet section bottom wall 15. The edges of the pan 20 are bent up at a 90% angle to provide a pair of vertical walls 21 which overlap exteriorly the side walls 22, formed integrally with the top 19. These walls 22 first converge, and then flare outwardly therefrom to form the venturi throat 18. The bottom pan 20 is inclined gradually, rearwardly from the duct mouth section 23 to the point 18, and thereafter more steeply to provide a sump 24.

The pan 20 is detachably and pivotally secured to the outside of the side walls 22 by brackets 25 which are preferably made integrally with vertical support members 26. The latter are secured as by welding to the outside of the duct walls 22, and receive the threaded ends 27 of the rods 28 by which the entire duct unit may be suspended from the ceiling. The cooperating orificed elements 29 are brought into abutment with brackets 25 in such a manner that the holes in both pieces are in registry, and pins 30 are then inserted through both holes thereby to secure the pan 20 both detachably and pivotally to the bottom to the lower edges of the side walls 22.

The manner in which the pan 20 is brought up against and sealed to the lowermost extremities of the side walls 22 may best be understood by a consideration of Figure 5. The lowermost edge of the wall 22 has a longitudinal angle iron united therewith on its inner side to form a horizontal shelf or flange 32. To effect sealing, a bent spring-like metal strip 34 is provided to fit over the inwardly projecting flange or shelf 32. The strip 34 is bent into an S-shaped cross section with one edge bent down further at 36 to an angle of approximately 90° to the top edge 38 of the strip. This edge 40 then rests upon the innermost area of the top of the shelf or flange 32 and the lower resilient folded metal with a bend 42 is diposed between the bottom side of the shelf or flange 32 and the floor of the pan 20. Thus one thickness of the sealing strip 34 is on the upper side of the flange 32 and the portion of the sealing strip under the flange 32 is folded to provide two thicknesses, the fold providing a spring action. This arrangement results in disposing the edge 44 of the strip 34 in contact with the floor of the pan 20 to effect, particularly when any moisture is on the bottom of the pan, a good seal between the shelf or flange 32 and the floor of the pan 20, the pressure of the seal being provided by the spring action. The strip 34 is extended from the venturi throat 18 to the exit of the mouth section 23. A similar strip to that shown in Figure 5 is provided to effect a seal between the lower extremity of the right hand wall 22 and the bottom of the pan.

It will be appreciated that the use of these strips 34 in no way interferes with the lowering or complete removal of the pan 20. Whenever it is desired to clean the bottom of the pan 20, the pins 30 are removed from the holes in the brackets 25 and cooperating elements 29 on one side of the duct and the pan is then pivoted downwardly and around the pins on the other side of the duct in the manner shown in Figure 1. If it is desired to clean or replace the strips 34 this may be done simply by pulling these strips off the shelf or flange 32. The cleaned strip 32, or a new one, is then simply slipped back over the shelf or flange 32 and spring clipped thereon. When the pan 20 is then pivoted back upwardly to where the holes in the brackets 25 and cooperating elements 29 are in registry so that the pins 30 may be inserted therethrough, the edge 44 of the strip 34 will be found to press firmly against the bottom of the pan 20 for the full length of the strip to re-seal the sides to prevent the escape of moisture and moisture laden air between the bottom of the shelf or flange 32 and the bottom and sides of the pan 20.

In the end portion of the duct, it has been customary to provide one or more excess moisture eliminators 50 in the apparatus shown in Figures 1, 3 and 4. Two such eliminators 50 are provided to fill completely the cross section of the mouth 23 of the duct. Each eliminator is constructed of a pair of side walls 52, 53, a bottom plate 54 which has been orificed at a series of points 51, two upper cross members 55 and 56 and a cover 57 hinged to cross member 56. To complete the boxes bottom cross members 58 and 59 are provided to extend between the lowermost extremities of walls 52 and 53. Each of the cross members 55, 56, 58 and 59 is slotted at 60 in the manner shown in Figures 6 and 7, the function of these slots being to receive the edges of a series of crenolated blades or vanes 62. Each of the vanes 62 may be seen to be removable from the box simply by sliding it vertically upwardly after the box cover 57 is swung back to the position shown in Figure 5. To provide some support for the box structure, the center vane 63 is anchored by screws and soldering to the orificed bottom plate 54. The vanes 62 are constructed of thin sheets of metal which are crimped or stamped to the shape best shown in cross section in Figure 7. As is well understood in the art, these vanes must be disposed in the eliminator box in such a manner that there is only a very slight direct air flow passage between adjacent vanes. Unfortunately, since the vanes are normally constructed of light weight metal sheets, they do not tend to hold their shape—particularly after they have been once removed from the box for cleaning. The original shape of the vanes 62, which is shown in Figure 7, is normally distorted after cleaning to a much less symmetrical pattern. When the vanes are reinserted in the slots 60, without employment of the present invention, the width of the passages 64 between adjacent vanes 62 will be found to vary considerably, some being of such width that there is a restricted passage 64, with the result that the air moved through the blading defining the passage becomes turbulent and deposits an excessive amount of moisture on the blading walls. Other pairs of vanes will be spaced so far apart that the air moves quickly therethrough without depositing any substantial amount of its excess moisture on the walls of the vanes with resultant undesirable dampening of the storage area which the apparatus is designed only to humidify. As has been previously pointed out, this tendency of the blading upon the replacement undesirably to define passages of different widths requires anyone serving such equipment to spend a considerable amount of time attempting to realign the blades. Usually this is accomplished with reference to a source of light. The present invention eliminates the necessity of manual realignment in that there is provided on the underside of the cover 57 a downwardly projecting notched or serrated member 68. This member may be welded or otherwise secured to the underside of the cover 57, and is positioned at the plant where the eliminator boxes are manufactured, so that each vane 62 is properly aligned at that time to provide optimum passage width. The member 68 is constructed of a rigid piece of metal which is notched at a series of points 70. The location of the apex 72 of each notch is predetermined at the factory, and the slope of the cuts in the member 68 which lead to the apexes 72, is such that whenever the cover is swung down over the series of misaligned vanes 62, the tops of each of the vanes are forced to ride up the slope 74 until the blade is received in the apex 72. Thereby each of the blades is reformed to its original and proper shape, and realigned as respects its adjacent blades so that proper passage width results in each instance. Moreover, when the cover is secured down firmly upon the top of the box, the member 68 serves as a structural support to maintain proper shape and alignment of the blades. It will be readily appreciated that the use of this important addition to the eliminator box represents a substantial contribution to the art in that the hitherto bothersome problem of vane reforming and realignment after removal and cleaning of the blades is very simply solved.

It will be obvious to one skilled in the art that various modifications may be made of the structure which I have thus disclosed without departing from my invention. All these modifications, I intend to comprehend within the scope of my invention.

I claim:

1. In a forced draft humidifying unit in the form of an exposed elevated horizontal duct of venturi construction having top and side walls, the combination therewith of: a bottom member having upturned flanges along its opposite longitudinal sides to overlap the outer surfaces of the lower margins of said side walls, said bottom member being hingedly mounted to swing downward to one side for cleaning operations; longitudinal horizontal flanges extending inward from said side walls adjacent said bottom member; and two sealing means extending along the opposite longitudinal sides respectively of said bottom member with lower edges of the sealing means in contact with the bottom member, each of said sealing means being a resilient longitudinal metal strip of generally S-shaped cross-sectional configuration with an upper fold embracing the corresponding horizontal flange for engagement therewith and with a lower fold under the horizontal flange and compressed thereby to provide sealing pressure along said lower edge of the metal strip.

2. A combination as set forth in claim 1 which includes pivot means releasably supporting the opposite longitudinal sides of said bottom member at the assembled position thereof to permit the bottom member to be swung downward to either side for cleaning operations.

References Cited in the file of this patent

UNITED STATES PATENTS

| | | |
|---|---|---|
| 1,064,412 | White | June 10, 1913 |
| 1,402,147 | Day | Jan. 3, 1922 |
| 1,794,115 | Klaff | Feb. 24, 1931 |
| 1,841,286 | Gilmore et al. | Jan. 12, 1932 |
| 2,217,130 | Niehart | Oct. 8, 1940 |
| 2,252,724 | Myers | Aug. 19, 1941 |
| 2,296,359 | Martinet | Sept. 22, 1942 |